H. S. PIERCE.
AUTOMATIC TAKE-UP FOR DRIVE CHAINS.
APPLICATION FILED FEB. 16, 1916.
1,188,316.
Patented June 20, 1916.
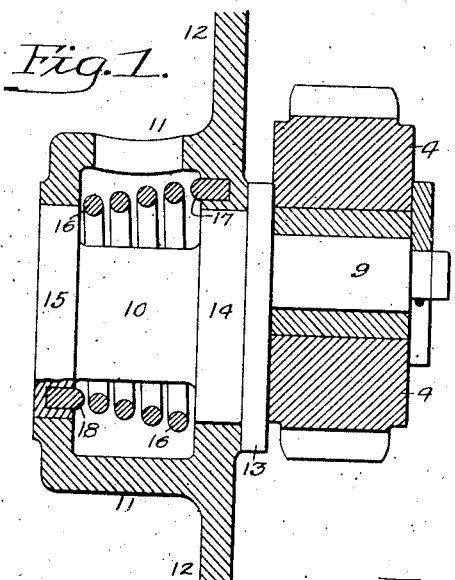
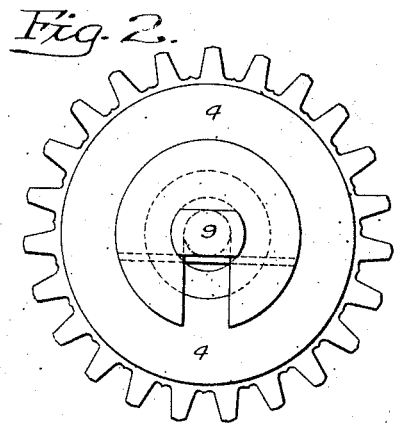
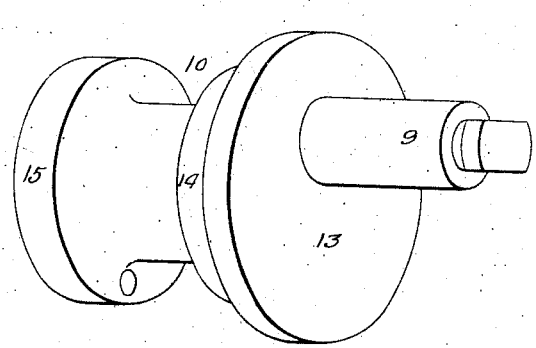
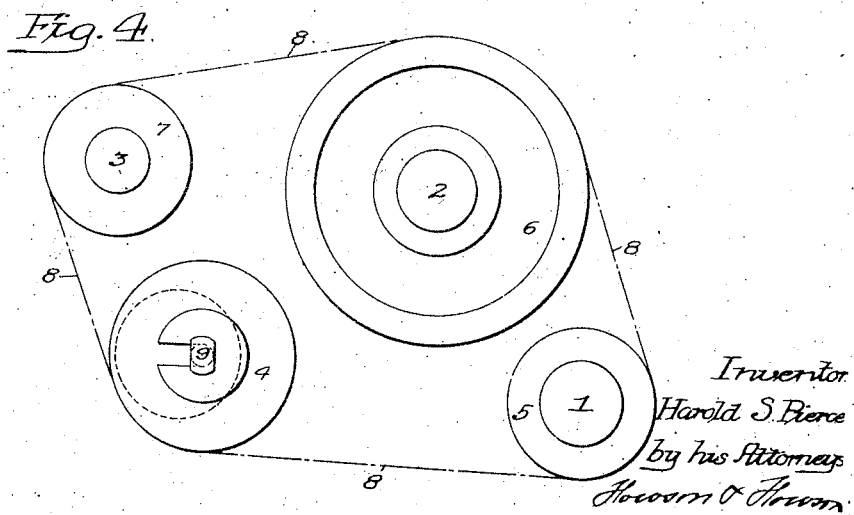
Inventor
Harold S. Pierce
by his Attorneys

UNITED STATES PATENT OFFICE.

HAROLD S. PIERCE, OF PHILADELPHIA, PENNSYLVANIA, ASSIGNOR TO LINK-BELT COMPANY, OF PHILADELPHIA, PENNSYLVANIA, A CORPORATION OF ILLINOIS.

AUTOMATIC TAKE-UP FOR DRIVE-CHAINS.

1,188,316.　　　　Specification of Letters Patent.　　Patented June 20, 1916.

Application filed February 16, 1916.　Serial No. 78,739.

*To all whom it may concern:*

Be it known that I, HAROLD S. PIERCE, a citizen of the United States, residing in Philadelphia, Pennsylvania, have invented certain Improvements in Automatic Take-Ups for Drive-Chains, of which the following is a specification.

The object of my invention is to provide automatic means for taking up the slack due to the wear of the joints of a drive chain.

The invention is particularly adapted for use in places which are not readily accessible and especially in the driving mechanism of an automobile.

In the accompanying drawing:—Figure 1, is a sectional view of my improved automatic take-up for drive chains. Fig. 2, is an end view; Fig. 3, is a perspective view of the eccentric carrier for the take-up wheel; and Fig. 4, is a diagram showing the arrangement of the take-up wheel in respect to the driving and driven elements.

Referring in the first instance to the diagram, Fig. 4, 1 is the crank shaft of an automobile. 2 is the cam shaft. 3 is the pump or magneto shaft and 4 is the take-up wheel. On the shafts 1, 2 and 3 are sprocket wheels 5, 6 and 7, respectively, and a chain 8 passes around the several sprocket wheels and the take-up sprocket wheel 4. The object of this take-up is to take up the slack in the chain automatically as the parts wear away.

The take-up sprocket wheel 4 is mounted on a spindle 9 projecting from a carrier 10. This carrier is mounted in a bearing 11 in the frame 12. The spindle is located eccentrically in respect to the center line of the carrier so that, on the rotation of the carrier in one direction, the slack of the chain will be taken up and, on the rotation of the carrier in the opposite direction, the slack of the chain will be increased.

In the present instance, the carrier has a flange 13 bearing against the casing 12 and two bearing portions 14 and 15 which fit snugly in the bearing 11. The carrier is reduced in diameter between these two portions 14 and 15 and the bearing is preferably recessed.

16 is a coiled spring having one end 17 adapted to a recess in the frame 12 and the other end 18 adapted to a recess in the portion 15 of the carrier, and the spindle 9 is so located in respect to the several shafts 1, 2 and 3 that the tendency of the spring is to move the spindle 9 away from the other shafts and thus tighten the chain. The strength of the spring is such that it will take up the slack and will prevent rattling, but will not cause undue binding of the parts.

While the invention is particularly adapted for use in the chain drives of automobile engines, it will be understood that it can be applied to other mechanisms without departing from the essential features of the invention.

I claim:—

1. The combination in an automatic take-up for drive chains, of a sprocket wheel around which the chain passes; a carrier having a spindle located eccentrically in respect to the center line of the carrier and arranged to support the sprocket wheel; a bearing for the carrier; and a spring having one end connected to the bearing and so arranged that when the sprocket wheel is located in contact with the drive chain it will automatically take up the slack therein.

2. The combination of a series of sprocket wheels; a chain passing around the sprocket wheels; a carrier; an eccentrically located pin on the carrier on which one of said sprocket wheels is mounted, the body of the carrier being cylindrical; a bearing in which the cylindrical body is mounted; and a coiled spring surrounding the cylindrical body and attached at one end to the carrier and at the other end to the bearing.

3. The combination of a series of sprocket wheels; a chain passing around said wheels; a carrier having an eccentric spindle projecting therefrom and on which one of the sprocket wheels is loosely mounted, the said carrier having two cylindrical members connected together by a reduced portion; a bearing in which the two members are located; and a coiled spring surrounding the reduced portion of the carrier, the forward end of the spring being adapted to a recess in the bearing and the rear end of the spring being adapted to a recess in the carrier.

HAROLD S. PIERCE.